US005768509A

United States Patent [19]

Günlük

[11] Patent Number: 5,768,509
[45] Date of Patent: Jun. 16, 1998

[54] SHORT MESSAGE SERVER WITHOUT LOCAL CUSTOMER DATABASE

[75] Inventor: Tuncay Günlük, Stratford, Conn.

[73] Assignee: ADC NewNet, Inc., Minnetonka, Minn.

[21] Appl. No.: 628,902

[22] Filed: Apr. 8, 1996

[51] Int. Cl.[6] ................................................ G06F 13/00
[52] U.S. Cl. ..................... 395/200.33; 455/428; 370/312
[58] Field of Search ....................... 395/601, 611,
395/616, 800.01, 200.31, 200.33, 200.68;
370/312, 351; 379/59, 89, 185, 196, 219,
242; 455/11-1, 89, 412, 237, 575, 428

[56] References Cited

U.S. PATENT DOCUMENTS

| 4,621,362 | 11/1986 | Sy | 370/403 |
|---|---|---|---|
| 5,329,578 | 7/1994 | Brennan | 379/67 |
| 5,351,235 | 9/1994 | Lahtinen | 370/58.1 |
| 5,517,497 | 5/1996 | Le Boudec et al. | 370/399 |
| 5,579,372 | 11/1996 | Astrom | 455/412 |
| 5,594,739 | 1/1997 | Lemieux | 370/350 |
| 5,610,969 | 3/1997 | McHenry et al. | 455/435 |
| 5,659,544 | 8/1997 | La Porta et al. | 370/312 |
| 5,659,595 | 8/1997 | Chanu et al. | 455/411 |
| 5,661,516 | 8/1997 | Carles | 348/8 |
| 5,678,179 | 10/1997 | Turcotte et al. | 455/331 |
| 5,699,407 | 12/1997 | Nguyen | 379/59 |

*Primary Examiner*—Alpesh M. Shah
*Attorney, Agent, or Firm*—David P. Gordon; David S. Jacobson; Thomas A. Gallagher

[57] ABSTRACT

A short message server (SMS) is provided with memory for storing short messages, and a SMS gateway/interworking (processing) block. The SMS accepts all properly formatted incoming messages, and queries an HLR database for destination information as well as to determine whether the destination of each incoming message is valid and authorized. If the destination is either not valid or not authorized, the SMS sends an error message to the originator, and effectively deletes the message from its memory. Where the destination is valid and authorized, the message is forwarded towards its destination. The SMS specifically does not include a subscriber database, and instead relies on the communication with the HLR and its subscriber database to provide the necessary information. Communication between the SMS and the HLR is preferably via the GSM MAP (mobile application part) protocol.

14 Claims, 3 Drawing Sheets

SHORT MESSAGE SERVER WITHOUT LOCAL CUSTOMER DATABASE

BACKGROUND OF THE INVENTION

1. Field of the Invention

The present invention relates to mobile telecommunications. More particularly, the present invention relates to a short message server (SMS) for a mobile telecommunications system. The invention has particular application to the Global System Mobile (GSM) standard, as well as the Signaling System 7 (SS7) network.

2. State of the Art

The field of telecommunications short messaging has recently been experiencing a period of explosive growth. Short messaging generally involves the transmission of short (generally up to 140 octets carrying up to 160 characters of text) alphanumeric messages between a message handling system and a mobile subscriber. While the short messages were originally utilized primarily for paging purposes, various additional applications, including stock quotations, and weather, traffic, news, and sports broadcasting are now common or expected to be shortly available.

Short messaging may be originated from either the short message service center or from the mobile subscriber. Detailed technical specifications (standards) such as GSM Technical Specifications 03.40 and 09.02 (which are hereby incorporated by reference herein in their entireties) are available which define many of the protocols and functionalities regarding short message servers.

As is known in the art, a short message server (SMS—also called short message service center) consists of two main functional blocks; a short message service center database, and a short message gateway/interworking block. The database is used for storing short messages as well as for storing a database of subscribers. The gateway/interworking block is responsible for interfacing the SMS to the GSM network and delivering the short messages to the recipient.

The SMS is arranged to interface with external agents call Short Message Entities (SMEs). Such entities include voice mail and electronic mail networks. The SMS provides access to the SMEs through a uniform Short Message Client Interface (SMCI) based on TCP/IP. The programs utilizing this interface to submit, receive and manage short messages are called Short Message Clients (SMCs). Some of the SMCs are gateways to other networks, while others provide user interface or other local functionality. The SMCs may execute on the same computer as the SMS or be located at a different location as long as a TCP/IP connection exists between each SMC and the SMS.

When messages are sent from an SMC to the SMS, as implied by the GSM 03.40 short message specification, the SMS checks its database to determine whether the short message destination is valid and authorized to receive the short message. If it is not, the SMS sends an error message to the SMC and does not accept or store the short message. On the other hand, if the message destination is valid and authorized, the short message is stored in the database portion of the SMS. Utilizing the gateway/interworking functionality, the SMS then initiates routing queries (typically utilizing SS7-TCAP protocol) to the home location register (HLR) about the location of the destined subscriber. If successful routing information is received from the HLR, the SMS attempts to deliver the text message to the mobile service switching center (MSC) which is currently serving that mobile subscriber. If the delivery fails for any reason, including the fact that the subscriber may not be accessible at the moment, the SMS periodically tries to redeliver the text message. Following delivery attempts, the SMS also notifies the result of the delivery action to the HLR so that the HLR can update its internal tables if necessary.

While the short message servers of the prior art generally function properly to satisfy the GSM specifications, the cost of a prior art SMS is large, primarily due to the large amount of memory required. For example, the prior art short message servers maintain databases with lists of up to hundreds of thousands of subscribers. Because of the memory requirements in supporting each subscriber, the short message servers of the prior art are typically limited in the number of subscribers they can support. Furthermore, the maintenance of the subscriber database is extremely labor-intensive and prone to errors, and performance suffers as the database must be consulted on every attempt of a short message client to provide a short message to the SMS.

SUMMARY OF THE INVENTION

It is therefore an object of the present invention to provide a short message server which meets the requirements of various standards, but which has relatively limited memory requirements.

It is another object of the invention to provide an SMS which effectively is not limited in the number of subscribers it can service.

It is a further object of the invention to provide an SMS which has a very high performance.

It is an additional object of the invention to provide an SMS which does not keep a subscriber database, but which utilizes information in the HLR database to determine whether a message destination is valid and authorized.

In accord with the objects of the invention, a short message server is provided with an SMS database which stores short messages and an SMS gateway/interworking (processing) block, with the short message server being arranged to accept all incoming messages, to query an HLR database to determine whether the destination of each incoming message is valid and authorized (as well as the subscriber's location), to send an error message to an SMC where the destination is not valid or authorized, and to send the message to the destination where the destination is valid and authorized. The short message server specifically does not include a subscriber database, and instead relies on the communication with the HLR and its subscriber database to provide the necessary information. Communication between the SMS and the HLR is preferably via the GSM MAP (mobile application part) protocol.

With the SMS of the invention, the size of the SMS database need be sufficient only to temporarily store short messages which cannot be immediately delivered. Thus, the number of subscribers which can be serviced by the SMS is virtually unlimited. Furthermore, the performance of the SMS is enhanced relative to the servers of the prior art as there is no need to access a large database at the SMS prior to finding the subscriber's location from the HLR.

Additional objects and advantages of the invention will become apparent to those skilled in the art upon reference to the detailed description taken in conjunction with the provided figures.

DETAILED DESCRIPTION OF THE PREFERRED EMBODIMENT

Figure 1:
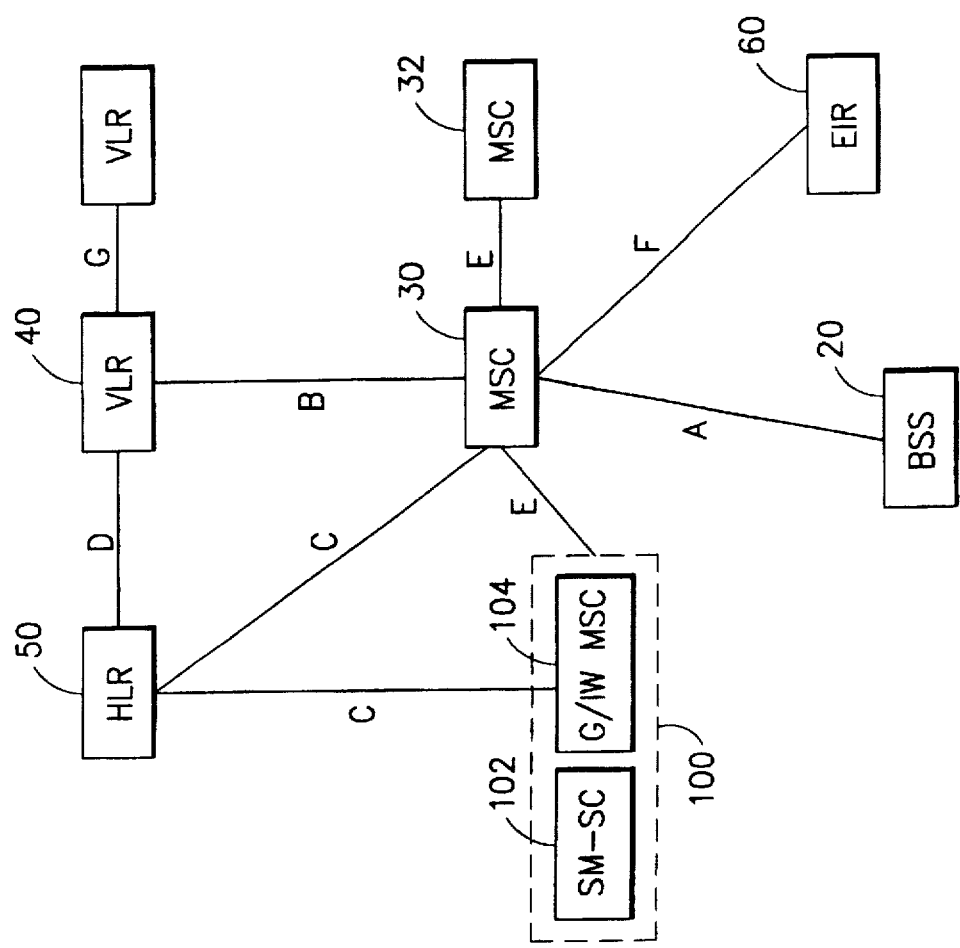
FIG. 1 is a block diagram of the basic components of a GSM network including the short messaging server (SMS) of the invention.

Turning to FIG. 1, the basic components of a GSM network are shown. In particular, a base station subsystem (BSS) 20 which communicates with cellular phones of mobile subscribers (not shown) is shown coupled to a mobile service switching center (MSC) 30 via an "A" interface. The MSC 30 is in turn coupled to another MSC 32 via an "E" interface, to a visitor location register (VLR) 40 via a "B" interface, to a home location register (HLR) 50 via a "C" interface, and to an equipment identity register 60 (EIR) via an "F" interface. Of particular import for the present invention, the MSC 30 is also shown coupled to a short message center 100 via an "E" interface. The short message service center 100 (SMS), which broadly includes a SMS memory block (SM-SC) 102 and a SMS gateway/interworking block 104, is also coupled to the HLR 50 via a "C" interface. For purposes herein, the GSM system components and interfaces are preferably as defined in various GSM standards.

As will be described in more detail hereinafter with reference to FIG. 3, the short message server 100 is configured as an SS7 network element with its own point code, and is embodied as a computer such as a SUN SPARC workstation or a MOTOROLA or IBM Power PC with internal memory (ROM) and with associated interfaces and a large external memory (e.g... hard disk RAM). The external memory is the SMS memory block 102 which stores short messages, but is not intended to store a subscriber database as do the SMS memory blocks of the prior art. The gateway/interworking block 104 utilizes the processing power of the workstation as well as the associated interfaces. The gateway/interworking block 104 is arranged, as discussed in more detail below with reference to FIG. 3, to accept all incoming messages, to query an HLR database to find the location of the subscriber being called and to determine whether the destination of each incoming message is valid and authorized, to send an error message to an SMC where the destination is not valid or authorized, and to send the message to the destination where the destination is valid and authorized. Communication between the SMS and the HLR is preferably via the SS7-GSM-MAP (mobile application part) protocol as discussed with reference to FIG. 2.

Figure 2:
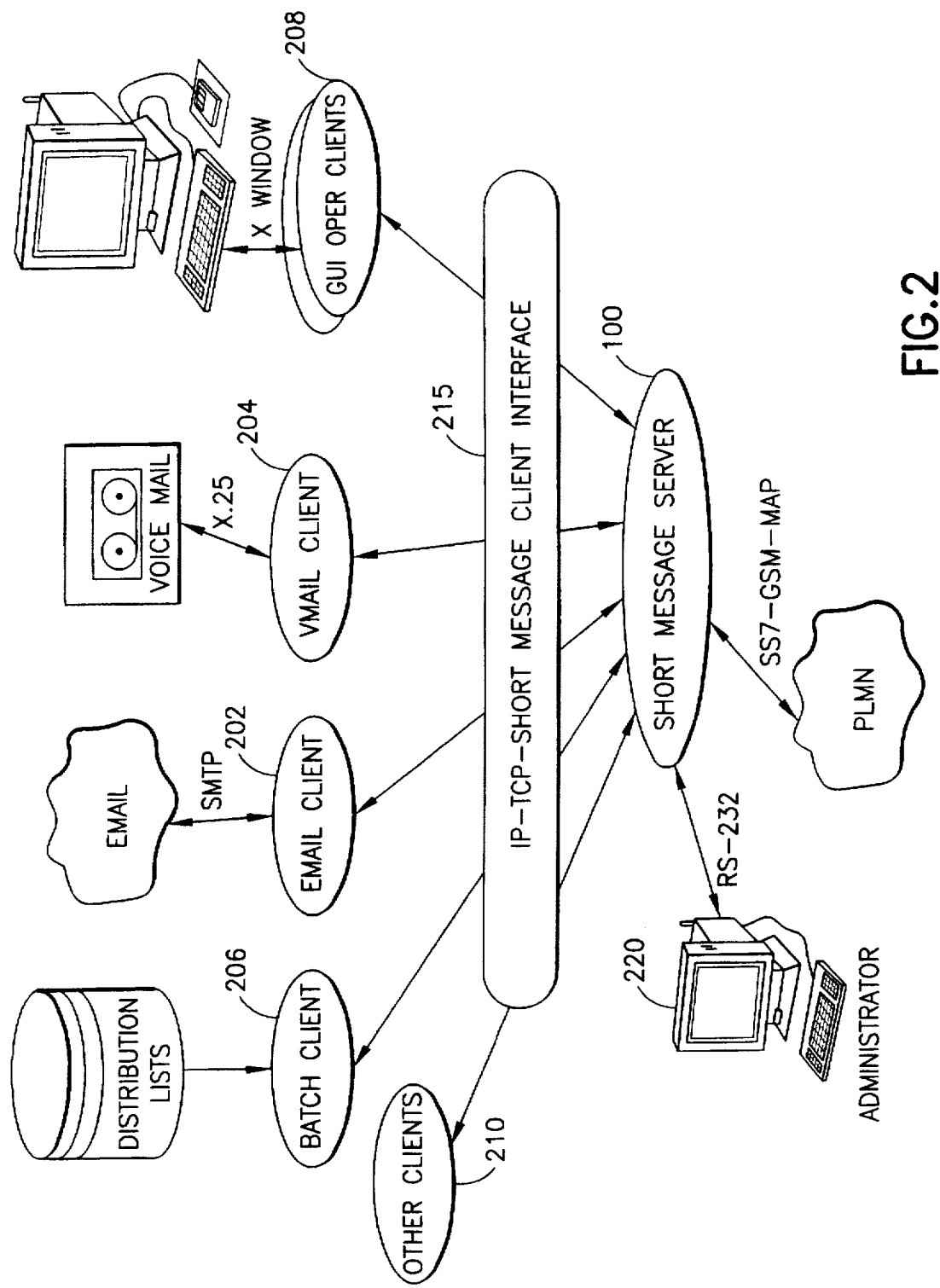
FIG. 2 is a diagram of the external interfaces of the SMS of the invention.

Before turning to the relevant details of the software of the SMS 100, it will be appreciated that as discussed above the SMS 100 preferably provides the capability of interfacing with several different external entities. For example, and as seen in FIG. 2, access to the SMS 100 may be gained via an E-Mail client 202, a voice-mail (V-Mail) client 204, a batch client 206, a graphic user interface (GUI) client 208, and other clients 210 through an IP-TCP short message client interface 215. In addition, the SMS 100 may be accessed by a controller/administrator 220 via an RS-232 port, and by the public land mobile network (PLMN) via the SS7-GSM-MAP protocol. Details of these interfaces as well as additional details regarding the invention may be gained by obtaining Part No. D-0071-S0-000-001 from Newnet Incorporated of Shelton, Conn., the assignee hereof.

Figure 3:
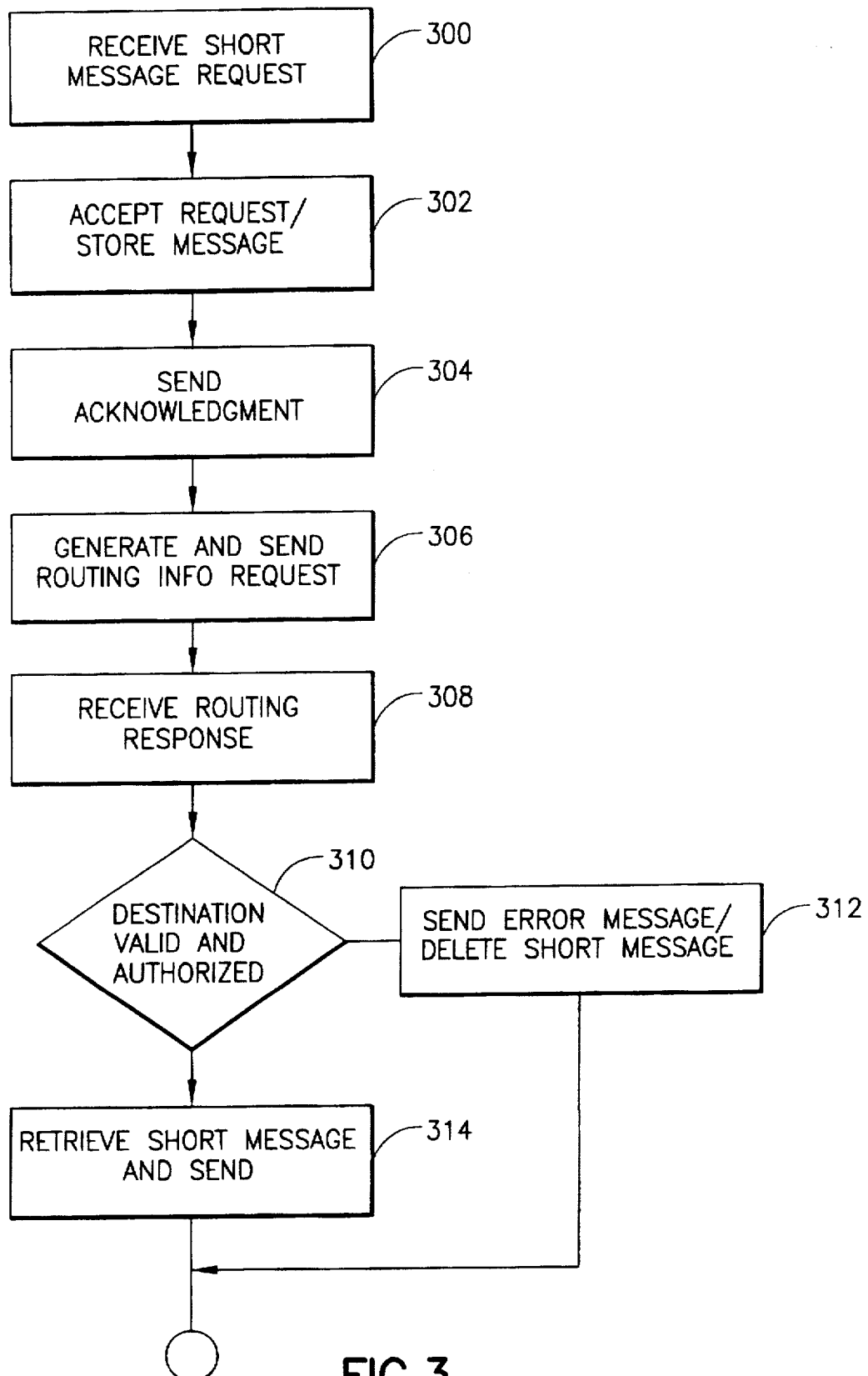
FIG. 3 is a flow diagram representing a partial functioning of the short message gateway/interworking block of the invention according to the invention.

Turning now to FIG. 3, details are seen in flowchart form of a portion of the software which runs the SMS workstation 100. In particular, at 300, when the gateway/interworking block of the SMS receives a properly formatted request for the transmission of a short message (SUBMIT-SM), the SMS at 302 accepts the request and stores the short message in memory block (SM-SC) along with proper identification. It is particularly noted that the short messages of all properly formatted requests are initially stored by the SMS upon receipt regardless of whether or not the destination of the message is to an authorized subscriber. At 304, the gateway/interworking block of the SMS sends an acknowledgement (ACK) to the originator of the request for transmission, and at 306 generates a TCAP routing information request (TCAP Send_Routing_Info_For_SM) to the HLR preferably utilizing specifications GSM03.40 and GSM09.02. The routing information request preferably includes information relating to several fields of the routing information request, including a destination number (as provided by the originator in the original request), an origination number (i.e., the number or point code of the SMS), a priority field, and a teleservice field (which sets forth the purpose of the query). In response to the routing information request, among other things, the HLR searches its subscriber database for the indicated destination number. The HLR subscriber database typically includes generally static information regarding the subscriber account as well as dynamic information regarding the subscriber location. Based on the information contained in the subscriber database, the HLR generates a routing response which is received by the gateway/interworking block of the SMS at 308. The routing response includes a location field for the destination as well as a return code field. The data in the location field provides the SMS with the last known location of the destination and thereby dictates to which MSC the SMS will forward the short message (if valid). The return code field, on the other hand indicates whether the message is valid. Thus, the return code may include various error codes such as illegal subscriber (E_Illegal_Sub), and absent subscriber (E_Absent_Sub).

Upon receiving the routing response, if at 310 the return code indicates an error such as the destination not being valid or authorized, at 312 the gateway/interworking block of the SMS preferably sends an error message to the originator of the short message and eliminates the message from the memory block. On the other hand, if at 310, the return code indicates that the destination is valid and authorized, at 314 the gateway/interworking block of the SMS retrieves the short message stored in the memory block, and sends the short message to the MSC indicated by the location field. In accord with various standards, in response to the sending of the short message, the MSC responds to the SMS. The SMS then sends a report of delivery status to the HLR, which is responded to by the HLR.

It should be appreciated by those skilled in the art that where the short message originates from a mobile (cellular) phone, instead of the request for transmission of a short message taking the form of SUBMIT-SM, upon the cellular phone contacting the MSC, a TCAP—Forward Short Message is provided by the MSC to the short message server. In response, the SMS sends a TCAP—Forwarding Response to the MSC. The message flow then continues as set forth above with respect to steps 306 through 314, with the SMS first sending a TCAP Send Routing Info message to the HLR (which responds in kind), then sending a TCAP Forward Short Message to an MSC (which responds in kind), and then sending a TCAP Report Short Message Delivery Status to the HLR (which responds in kind).

Those skilled in the art will further appreciate that when a cellular phone is not initially available to receive a message (e.g., it is turned off), upon its becoming available again, messages are sent between the cellular phone and the MSC (and HLR). The HLR will then alert the SMS with a TCAP—Alert Service Center message, which is responded to by the SMS by sending a TCAP—Alerting Response to the HLR. The messages then continue as set forth above with respect to steps 306 through 314 with the SMS first sending a TCAP Send Routing Info message to the HLR, a TCAP Forward Short Message to the MSC, and a TCAP Report Short Message Delivery Status to the HLR.

With the SMS 100 of the invention, the size of the SMS memory need be sufficient only to temporarily store short messages which cannot be immediately delivered. Thus, the number of subscribers which can be serviced by the SMS is virtually unlimited. In addition, the performance of the SMS is enhanced relative to the servers of the prior art as there is no need to access a large database at the SMS prior to finding the subscriber's location from the HLR.

The SMS 100 is preferably a full-featured SMS and provides sophisticated message handling features such as message queuing, message redelivery, message validity time-outs, pre-defined messages, scheduled message delivery, and priority message delivery. In addition, the SMS preferably provide a billing system, traffic statistic gathering and management.

There has been described and illustrated herein a short message server which does require a large amount of memory for storing an entire subscriber database. While particular embodiments of the invention have been described, it is not intended that the invention be limited thereto, as it is intended that the invention be as broad in scope as the art will allow and that the specification be read likewise. Thus, while the invention has been described with particular reference to various GSM standards, those skilled in the art will appreciate that other protocols can be utilized. Also, while particular hardware and software for the SMS has been identified, it will be appreciated by those skilled in the art that other hardware could be utilized, and that various aspects of the software could be changed within the scope of the invention. It will therefore be appreciated by those skilled in the art that yet other modifications could be made to the provided invention without deviating from its spirit and scope as so claimed.

I claim:

1. A short message server which is coupled to a home location register (HLR) means and a mobile service switching center (MSC) of a mobile telecommunications network, said short message server comprising:

a) memory means for storing short messages; and
   b) processor means
      for receiving a properly formatted request for transmission of a short message from an originator, said properly formatted request including a destination and a short message,
      for forwarding all short messages of all properly formatted requests to said memory means regardless of whether or not the destination of the message is to an authorized subscriber,
      for generating a routing information request to the HLR in response to a properly formatted request,
      for receiving a routing response from the HLR having location information and return code information, and
      for retrieving said short message from said memory means and sending said short message to an MSC based on said location information when said destination is valid and authorized.

2. A short message server according to claim 1, wherein:
   said processor means includes means for effectively deleting said message from said memory means when said return code information indicates that said destination is at least one of invalid and unauthorized.

3. A short message server according to claim 2, wherein:
   said processor means includes means for sending an error message to the originator of the short message.

4. A short message server according to claim 1, wherein:
   said short message server has an SS7 identification number, and
   said routing information request includes information relating to the number of the destination, and said SS7 identification number of said short message server.

5. A short message server according to claim 1, wherein:
   said processor means includes means for sending an acknowledgement to the originator.

6. A short message server according to claim 1, wherein:
   said memory means has a size which is chosen based on storage required to temporarily store short messages which cannot be immediately delivered by said processor means.

7. A short message server according to claim 6, wherein:
   said size of said memory means is chosen without regard to a subscriber database.

8. A short message server according to claim 1, wherein:
   said processor means includes external interface means including a TCP-Short Message Client Interface for receiving a properly formatted request for transmission of a short message from at least one of an E-Mail client and a voice-mail client.

9. A short message server according to claim 1, wherein:
   said processor means includes external interface means for interfacing with the HLR.

10. A method of handling telecommunications short messages, comprising:

a) receiving a properly formatted request for transmission of a short message from an originator, said properly formatted request including a destination and a short message;
   b) forwarding all short messages of all properly formatted requests to a memory means regardless of whether or not the destination of the message is to an authorized subscriber;
   c) generating a routing information request to a home location register (HLR) in response to the properly formatted request;
   d) receiving a routing response from the HLR having location information and return code information; and
   e) retrieving said short message from said memory means and sending said short message to a mobile service switching center (MSC) based on said location information when said destination is valid and authorized.

11. A method according to claim 10, further comprising:

effectively deleting said short message from said memory means when said return code information indicates that said destination is at least one of invalid and unauthorized.

12. A method according to claim 10, further comprising:

sending an error message to the originator of the short message when said return code information indicates that said destination is at least one of invalid and unauthorized.

13. A method according to claim 10, further comprising:

after said receiving a properly formatted request, sending an acknowledgement to the originator of the properly formatted request.

14. A method according to claim 10, further comprising:

choosing a memory means having a size for storing short messages which must be temporarily stored because they cannot be immediately delivered to the destination.

* * * * *